United States Patent [19]

Powers

[11] Patent Number: 5,597,647
[45] Date of Patent: Jan. 28, 1997

[54] NONWOVEN PROTECTIVE LAMINATE

[75] Inventor: Michael D. Powers, Canton, Ga.

[73] Assignee: Kimberly-Clark Corporation, Neenah, Wis.

[21] Appl. No.: 425,517

[22] Filed: Apr. 20, 1995

[51] Int. Cl.$^6$ .............................. B32B 5/26; B32B 27/02
[52] U.S. Cl. ...................... 442/382; 428/374; 428/219; 428/913; 604/366; 604/381; 604/384
[58] Field of Search ..................... 428/282, 286, 428/288, 289, 374, 913, 219; 604/366, 381, 384

[56] References Cited

U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,502,538 | 3/1970 | Petersen | 161/150 |
| 3,502,763 | 3/1970 | Hartman | 264/210 |
| 3,542,615 | 11/1970 | Dobo et al. | 156/181 |
| 3,692,618 | 9/1972 | Dorschner et al. | 161/72 |
| 3,802,817 | 4/1974 | Matsuki et al. | 425/66 |
| 3,849,241 | 11/1974 | Butin et al. | 161/169 |
| 3,855,046 | 12/1974 | Hansen et al. | 161/150 |
| 4,196,245 | 4/1980 | Kitson et al. | 428/198 |
| 4,340,563 | 7/1982 | Appel et al. | 264/518 |
| 4,374,888 | 2/1983 | Bornslaeger | 428/198 |
| 4,631,933 | 12/1986 | Carey, Jr. | 66/192 |
| 4,879,170 | 11/1989 | Radwanski et al. | 428/233 |
| 4,891,957 | 1/1990 | Strack et al. | 66/192 |
| 4,897,296 | 1/1990 | Marshall, Jr. | 428/102 |
| 4,950,531 | 8/1990 | Radwanski et al. | 428/284 |
| 5,073,436 | 12/1991 | Antonacci et al. | 428/219 |
| 5,108,820 | 4/1992 | Kaneko et al. | 428/198 |
| 5,108,827 | 4/1992 | Gessner | 428/219 |
| 5,145,727 | 9/1992 | Potts et al. | 428/198 |
| 5,149,576 | 9/1992 | Potts et al. | 428/198 |
| 5,173,356 | 12/1992 | Eaton et al. | 428/219 |
| 5,188,885 | 2/1993 | Timmons et al. | 428/198 |
| 5,229,191 | 7/1993 | Austin | 428/198 |
| 5,232,770 | 8/1993 | Joseph | 428/284 |
| 5,294,482 | 3/1994 | Gessner | 428/287 |
| 5,306,545 | 4/1994 | Shirayanagi et al. | 428/198 |
| 5,308,691 | 5/1994 | Lim et al. | 428/286 |
| 5,336,552 | 8/1994 | Strack et al. | 428/224 |
| 5,382,400 | 1/1995 | Pike et al. | 264/168 |
| 5,415,925 | 5/1995 | Austin et al. | 428/287 |
| 5,425,987 | 6/1995 | Shawver et al. | 428/284 |
| 5,482,765 | 1/1996 | Bradley . | |

FOREIGN PATENT DOCUMENTS

| | | | |
|---|---|---|---|
| 0569860 | 11/1993 | European Pat. Off. | D04H 1/54 |
| 0674035 | 9/1995 | European Pat. Off. | D04H 1/56 |
| 4305271 | 8/1994 | Germany | D06N 7/00 |

OTHER PUBLICATIONS

"Polymer Blends and Composites" by John A. Manson and Leslie H. Sperling, copr. 1976 by Plenum Press, pp. 273–277.

*Primary Examiner*—Kathleen Choi
*Attorney, Agent, or Firm*—James B. Robinson

[57] ABSTRACT

There is provided a protective laminate having barrier properties which has a first outer layer having liquid repellency through the use of an internal, low surface tension liquid repellency additive and a bulky second outer layer having liquid absorbency through the use of an internal wetting agent, where the layers are bonded to form a laminate. When the laminate is used as part of a garment, the absorbent layer goes against the wearer.

7 Claims, No Drawings

NONWOVEN PROTECTIVE LAMINATE

BACKGROUND OF THE INVENTION

The advent of more resistant diseases as well as the AIDS virus has resulted in health-care industry workers being perceived to be at an increasing risk of infections, particularly bloodborne infections, from which protection is needed. Such workers traditionally have worn disposable fabric clothing of various types depending on the exact nature of the work they were performing. Some such clothing has been made from laminates of nonwoven fabrics such as those disclosed in U.S. Pat. No. 5,188,885 to Timmons et al. which use a spunbond-meltblown-spunbond or "SMS" construction. SMS fabric laminates have outside spunbonded layers which are durable, and an interior meltblown layer which is porous yet which inhibits the penetration of fluids and bacteria through the laminate. Another SMS laminate is disclosed in U.S. patent application Ser. No. 08/223,210 to Bradley et al. now U.S. Pat. No. 5,481,765 and discloses a laminate with improved repellency having a meltblown layer sandwiched between spunbond layers wherein the meltblown and spunbond layers may have between 0.1 to 2.0 weight percent of a fluorocarbon to improve repellency and the meltblown layer preferably has between 5 and 20 weight percent polybutylene. Such laminates are good barriers to penetration, yet improvement is needed and possible in response to more and more exacting regulation and the ever increasing concern about infection.

Another fabric produced in response to this increasing concern has been a fabric which incorporates a film as a layer of a laminate. Such films are certainly more impervious to liquid than a traditional SMS type fabric but have an important drawback. The drawback of film laminates is that they are generally uncomfortable to wear because their very imperviousness can trap perspiration against the wearer and make the wearer feel quite hot and clammy after a short time under typical conditions.

There remains a need for a laminate which will allow perspiration to pass through it quickly and easily but which will be even more repellent than the nonwoven fabrics currently available.

SUMMARY

The objects of this invention are provided by a protective laminate having barrier properties which has a first outer layer having liquid repellency through the use of an internal, low surface tension liquid repellency additive and a bulky second outer layer having liquid absorbency through the use of an internal wetting agent, where the layers are bonded to form a laminate.

When the laminate is used as part of a garment, the absorbent layer goes against the wearer.

DEFINITIONS

As used herein the term "nonwoven fabric or web" means a web having a structure of individual fibers or threads which are interlaid, but not in a regular, identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber. For example, the diameter of a polypropylene fiber given in microns may be converted to denier by squaring, and multiplying the result by 0.00629, thus, a 15 micron polypropylene fiber has a denier of about 1.42 ($15^2 \times 0.00629 = 1.415$).

As used herein the term "spunbonded fibers" refers to small diameter fibers which are formed by extruding molten thermoplastic material as filaments from a plurality of fine, usually circular capillaries of a spinnerette with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Levy, and U.S. Pat. No. 3,542,615 to Dobo et al. Spunbond fibers are generally not tacky when they are deposited onto a collecting surface and require an additional thermal, adhesive or other bonding step to integrate the web. Spunbond fibers are generally continuous and have diameters larger than 7 microns, more particularly, between about 10 and 30 microns.

As used herein the term "meltblown fibers" means fibers formed by extruding a molten thermoplastic material through a plurality of fine, usually circular, die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin. Meltblown fibers are microfibers which may be continuous or discontinuous, are generally smaller than 10 microns in diameter, and are generally tacky and self-bonding when deposited onto a collecting surface.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configuration of the material. These configurations include, but are not limited to isotactic, syndiotactic and random symmetries.

As used herein the term "monocomponent" fiber refers to a fiber formed from one or more extruders using only one polymer. This is not meant to exclude fibers formed from one polymer to which small amounts of additives have been added for coloration, anti-static properties, lubrication, hydrophilicity, etc. These additives, e.g. titanium dioxide for coloration, are generally present in an amount less than 5 weight percent and more typically about 2 weight percent.

As used herein the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein the term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

As used herein, through air bonding or "TAB" means a process of bonding a nonwoven bicomponent fiber web in which air which is sufficiently hot to melt one of the polymers of which the fibers of the web are made is forced through the web. The air velocity is between 100 and 500 feet per minute and the dwell time may be as long as 6 seconds. The melting and resolidification of the polymer provides the bonding. Through air bonding has restricted variability and is generally regarded a second step bonding process. Since TAB requires the melting of at least one component to accomplish bonding, it is restricted to webs with two components such as bicomponent fiber webs As used herein, the term "stitchbonded" means, for example, the stitching of a material in accordance with U.S. Pat. No. 4,891,957 to Strack et al. or U.S. Pat. No. 4,631,933 to Carey, Jr.

As used herein, "ultrasonic bonding" means a process performed, for example, by passing the fabric between a sonic horn and anvil roll as illustrated in U.S. Pat. No. 4,374,888 to Bornslaeger.

As used herein "thermal point bonding" involves passing a fabric or web of fibers to be bonded between a heated calender roll and an anvil roll. The calender roll is usually, though not always, patterned in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Other common patterns include a diamond pattern with repeating and slightly offset diamonds and a wire weave pattern looking as the name suggests, e.g. like a window screen. Typically, the percent bonding area varies from around 10% to around 30% of the area of the fabric laminate web. As in well known in the art, the spot bonding holds the laminate layers together as well as imparts integrity to each individual layer by bonding filaments and/or fibers within each layer.

As used herein, the term "bonding window" means the range of temperature of the mechanism, e.g. calender rolls, used to bond the nonwoven fabric together, over which such bonding is successful. For polypropylene spunbond, this bonding window is typically from about 270° F. to about 310° F. (132° C. to 154° C.). Below about 270° F. the polypropylene is not hot enough to melt and bond and above about 310° F. the polypropylene will melt excessively and can stick to the calender rolls. Polyethylene has an even narrower bonding window.

As used herein, the term "barrier fabric" means a fabric which is relatively impermeable to the transmission of liquids, i.e., a fabric which has blood strikethrough rate of 1.0 or less according to ASTM test method 22.

As used herein, the term "garment" means any type of non-medically oriented apparel which may be worn. This includes industrial work wear and coverails, undergarments, pants, shirts, jackets, gloves, socks, and the like.

As used herein, the term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coverails, aprons and jackets, patient bedding, stretcher and bassinet sheets, and the like.

As used herein, the term "personal care product" means diapers, training pants, absorbent underpants, adult incontinence products, and feminine hygiene products and the like.

TEST METHODS

Hydrohead: A measure of the liquid barrier properties of a fabric is the hydrohead test. The hydrohead test determines the height of water (in centimeters) which the fabric will support before a predetermined amount of liquid passes through. A fabric with a higher hydrohead reading indicates it has a greater barrier to liquid penetration than a fabric with a lower hydrohead. The hydrohead test is performed according to Federal Test Standard No. 191A, Method 5514.

Frazier Porosity: A measure of the breathability of a fabric is the Frazier Porosity which is performed according to Federal Test Standard No. 191A, Method 5450. Frazier Porosity measures the air flow rate through a fabric in cubic feet of air per square foot of fabric per minute or CSM. Convert CSM to liters per square meter per minute (LSM) by multiplying by 304.8.

Tensile: The tensile strength of a fabric may be measured according to the ASTM test D-1682-64. This test measures the strength in pounds and elongation in percent of a fabric.

Resistance to Blood Penetration (RBP): The blood strikethrough or resistance to blood penetration of a fabric is a measure of the amount of blood which penetrates the fabric at a particular pressure. The blood strikethrough is performed by weighing a blotter placed next to the fabric before and after the test which consists of applying 1 pound per square inch gauge (psig) pressure to the side of the fabric away from the blotter, which side has blood thereon. The pressure is ramped up over approximately 10 seconds and removed when it reaches 1 psig. The difference in the weight of the blotter before and after the test in grams represents the amount of blood which has penetrated the fabric.

Melt Flow Rate: The melt flow rate (MFR) is a measure of the viscosity of a polymers. The MFR is expressed as the weight of material which flows from a capillary of known dimensions under a specified load or shear rate for a measured period of time and is measured in grams/10 minutes at 230° C. according to, for example, ASTM test 1238, condition E.

DETAILED DESCRIPTION

The field of laminate fabrics is a diverse one encompassing components of absorbent products such as diapers, wipes and feminine hygiene products and barrier products such as surgical gowns and drapes, car covers, and bandages. Nonwovens are also used for more durable applications such as outdoor fabrics where resistance to the elements and to chemicals in the environment are important features.

A laminate has been developed by the inventors which has exceptional repellency to liquids yet which does not make the wearer of a garment made from such fabric hot, clammy and otherwise uncomfortable while wearing the garment under normal conditions.

The layers of material of which this invention is made may be produced by the meltblowing and spunbonding processes. These processes generally use an extruder to supply melted thermoplastic polymer to a spinnerette where the polymer is fiberized to yield fibers which may be staple length or longer. The fibers are then drawn, usually pneumatically, and deposited on a foraminous mat or belt to form the nonwoven fabric. The fibers produced in the spunbond and meltblown processes are microfibers as defined above.

The fabric of this invention is a multilayer laminate. One example of a multilayer laminate is an embodiment wherein some of the layers are spunbond and some meltblown such as a spunbond/meltblown/spunbond (SMS) laminate as disclosed in U.S. Pat. No. 4,041,203 to Brock et al., U.S. Pat. No. 5,169,706 to Collier, et al, and U.S. Pat. No. 4,374,888 to Bornslaeger. Such a laminate may be made by sequentially depositing onto a moving forming belt first a spunbond fabric layer, then a meltblown fabric layer and last another spunbond layer and then bonding the laminate in a manner described below. Alternatively, the fabric layers may be made individually, collected in rolls, and combined in a separate bonding step. Such fabrics usually have a basis weight of from about 6 to about 400 grams per square meter (gsm) or approximately 0.1 to 12 ounces per square yard (osy).

More particularly, the applicants have found that a laminate having a liquid repellent layer with an internal liquid repellent on one outside surface and an absorbent layer having an internal wetting agent on the other outside surface, surprisingly provides enhanced repellency to liquid penetration as well as increased wearer comfort. In a garment such as a surgical gown, the absorbent layer is the layer against the wearer. The laminate may have any number of layers as long as it has the absorbent outer layer against the skin of the wearer.

While the inventor does not wish to be bound by this belief, he theorizes that the absorbent layer distributes and absorbs any liquid that penetrates the repellent layer and thereby prevents it from continuing through to the skin of the wearer. In conventional SMS fabrics the meltblown layer performs the barrier function. Therefore, it was previously believed that an absorbent layer against the skin would pull liquid through the outer layer of the laminate and accelerate garment penetration by liquids. That an absorbent layer would act as a barrier or repellent layer is a unique and surprising aspect of this invention.

Another advantage of the laminate of this invention is found in the use of internal, as opposed to topical, additives. Internal additives allow much more precise control over their location whereas topically applied additives tend to migrate to, or at least contaminate other layers of a laminate. This is especially important in the laminate of this invention since the additives to the layers have opposite properties and functions. Topical additives also tend to be far more fugitive than internal additives, resulting in loss of the desired properties as the additive departs. Even if topical additives could be controlled adequately in an application such as this one, additional capital costs would be incurred for application equipment. In the case of this invention, capital costs for topical additive application would be even greater since two layers are treated with different additives.

The repellent layer of this invention may be a spunbond layer produced from a polypropylene polymer or copolymer and contains an internal, alcohol repellency additive such as, for example, fluorocarbons as disclosed in U.S. Pat. No. 5,149,576 to Potts et al. and any of those taught in U.S. Pat. No. 5,178,931, column 7, line 40 to column 8, line 60. A particularly well suited additive is FX-1801, formerly called L-10307, which is available from the 3M Company of St. Paul, Minn. This material is identified as Additive M in U.S. Pat. No. 5,178,931 and as having a melting point of about 130° to 138° C. This material is added to the repellent layer at an amount of about 0.1 to about 2.0 weight percent or more particularly between about 0.25 and 0.75 weight percent, and still more particularly between 0.4 and 0.5 weight percent. As noted in the above patent, the fluorocarbon additive is an internal additive, as differentiated from a topically applied additive, and preferentially migrates within the fibers to the surface of the fibers as they are formed.

The thermoplastic polymers which may be used in the practice of this invention may be any known to those skilled in the art to be commonly used in meltblowing and spunbonding. Such polymers include polyolefins, polyesters and polyamides, and mixtures thereof, more particularly polyolefins such as polyethylene, polypropylene, polybutene, ethylene copolymers, propylene copolymers and butene copolymers and mixtures thereof. Particular polymers for a spunbond layer may be those known as PF-305 from Himont Chemical of Wilmington, Del. and PD-3445 and PD-9355 from Exxon Chemical of Houston, Tex.

The laminate also preferably contains a repellent meltblown layer next to the outer repellent layer of this invention which may be produced from a polypropylene polymer or copolymer and contains an internal, alcohol repellency additive such as those described above. Particular polymers from which a meltblown layer may be produced are Himont's PF-015 and Exxon's 3746.

Either or both of the repellent spunbond and meltblown layers may also contain an anti-static compound such as LAROSTAT®HTS 904 available from PPG Industries, Inc. of Pittsburgh, Pa. and may also contain pigments, fire retardants and processing aids which are known in the art. A pigment, if used, is generally present in an amount less than 5 weight percent of the layer.

The absorbent outer layer of the laminate is believed to serve the purpose of distributing and absorbing any liquid which may penetrate the repellent layer so that it does not reach the skin. The important attributes of this layer are that it rapidly distribute liquid and that it have a high liquid capacity. The fabric which possesses these attributes is a bulky fabric which may be defined in terms of the density of a fabric. A suitable bulky 1 osy (33.9 gsm) fabric, for example, may have a thickness of from about 0.017 to about 0.085 inches (0.43 mm to 2.2 mm), yielding a density of from about 0.45 ounces/cubic inch to about 0.009 ounces/cubic inch (0.079 to 0.016 grams/cubic centimeter). A preferred range of density is 0.026 to 0.013 ounces/cubic inch (0.045 to 0.022 grams/cubic centimeter) and most preferred is 0.019 to 0.015 ounces/cubic inch (0.033 to 0.027 grams/cubic centimeter).

One method of achieving bulk is to use a crimpable fabric such as one made from conjugate fibers, more particularly, side-by-side conjugate fibers. Side-by-side conjugate fibers may be made, for example, from polyethylene and polypropylene. As these fibers are produced, they may be crimped because of their different coefficients of expansion according to the teaching of U.S. Pat. No. 5,382,400 to Pike et al.

If the absorbent layer is a conjugate spunbond layer it may be preferably made from polyethylene and polypropylene or a copolymer thereof in a side by side or sheath-core configuration. Particular polymers from which the conjugate layer may be produced are, for example Exxon's PD-3445 polypropylene and Dow Chemical Company's 6811A polyethylene.

The absorbent layer also contains an internal wetting agent such as MASIL® SF-19 from PPG Industries, Inc. of Pittsburgh, Pa., to increase the wettability of the layer in an amount of from about 0.7 to about 3 weight percent of the layer.

When using a conjugate layer as the absorbent layer it has been found to be advantageous to use an adhesive to bond this layer with the other, presumably monocomponent layers, of the laminate. This is because it is quite difficult to bond dissimilar polymer such as polyethylene and polypropylene by thermal means.

If an adhesive is used it could also be considered a meltblown layer since it is produced in the same manner as conventional meltblown fabric.

An adhesive layer may be made from any adhesive which may be meltblown, for example, it may be made from adhesive polypropylene or copolymers thereof such as that available from the Findley Adhesive Company of Findley, Ohio under the trade designation HH-9188 which is a copolymer of atactic polypropylene. Another example of an acceptable adhesive is a mixture of polybutylene and polypropylene such as DP-8911 polybutylene from Shell Chemical Co. of Houston, Tex. with polypropylene in mixtures of from 30/70 to 70/30 weight percent. Another example of a good adhesive for this invention is that of U.S. Pat. No. 5,149,741, hereby incorporated by reference, to Alper et al. and assigned to Findley Adhesives, Inc., of Wauwatosa, Wis. This is an adhesive which comprises about 15 to 40 parts of a styrene-isoprene-styrene block copolymer wherein the styrene content of the copolymer is 25 to 50 weight percent, about 40 to 70 parts of a compatible tackifying resin such as, for example, pentaerythritol esters, about 5 to 30 parts of a napthenic/paraffinic oil and 0.1 to 2 parts, by weight, of a phosphite antioxidant, hindered phenolic antioxidant and a stabilizer, where the adhesive has a melt viscosity of not greater than 6000 cP at 325° F.

The adhesive layer, if used, preferably contains an internal wetting agent such as MASIL® SF-19 from PPG Industries, Inc. of Pittsburgh, Pa. an amount of from about 0.7 to about 3 weight percent of the adhesive, or more particularly, 1.25 to 1.75 weight percent, to increase the speed at which liquids are absorbed. As in the repellent layer, other additives such as pigment, fire retardants, etc. may be present.

The preferred embodiment of this invention has an outer repellent spunbond layer of from about 0.1 to about 1 osy (3.4 to 34 gsm) containing a low surface tension liquid repellent in an amount of from about 0.1 to about 2 weight percent and an inner repellent meltblown layer of from about 0.1 to about 1 osy (3.4 to 34 gsm) containing a low surface tension liquid repellent in an amount of from about 0.05 to about 0.5 weight percent, adhesively bonded using from about 0.05 to about 0.5 osy (1.7 to 17 gsm) of a meltblown adhesive to an absorbent, polyethylene-polypropylene side-by-side conjugate fiber layer of from about 0.1 to about 3 osy (0.34 to 102 gsm) having a density of between about 0.026 and about 0.013 ounces/cubic inch and having an internal wetting agent in an amount from about 0.1 to about 3 weight percent. It is preferred that the laminate be thermally point bonded at a temperature between about 200° and 330 ° F. (93° and 166 ° C.). The fabric of this invention may be made by producing the non-adhesive layer(s) separately and combining them with the adhesive in a separate manufacturing step or by sequentially depositing each layer and thereby producing the laminate in one step. In one method, a repellent spunbond layer is produced onto a moving forming wire, a meltblown layer is produced onto the repellent spunbond layer, an adhesive is deposited onto the meltblown layer and a preformed conjugate spunbond layer is then unwound onto the adhesive layer. The entire sandwich is then bonded by thermal point bonding in addition to the adhesive bonding between the meltblown and conjugate layers.

Other methods of bonding the laminate may also be used such as hydroentanglement, needling, ultrasonic bonding and adhesive bonding.

EXAMPLE

A laminate was produced comprising a meltblown layer of about 0.5 osy (17 gsm) on a layer of spunbond material of about 0.5 osy (17 gsm). The meltblown layer was coated with an adhesive in an amount of about 0.1 osy (3.4 gsm)

and a conjugate spunbond layer of 1.0 osy (33.9 gsm) was deposited thereon for a final laminate with about a 2.1 osy (71.2 gsm) basis weight.

The first spunbond layer was made from polypropylene designated PD-3445 by Exxon and contained 3M's FX-1801 fluorocarbon in an amount of about 0.5 weight percent. The meltblown layer was made from polypropylene designated 3746G from Exxon. The meltblown layer contained 3M's FX-1801 fluorocarbon in an amount of about 1.5 weight percent. The adhesive used was a mixture of Shell's DP-8911 polybutylene with Exxon's 3746G polypropylene in a ratio of 1:1. The conjugate fiber was a side-by-side configuration using Exxon's PD-3445 polypropylene and Dow's 6811A polyethylene as the two polymers.

The laminate was measured for resistance to blood penetration (RBP), hydrohead, and Frazier porosity. The results are shown in Table 1 in comparison to a commercially available material.

TABLE 1

|  | SMS* | Example |
| --- | --- | --- |
| Laminate basis weight (osy) | 1.6 | 2.1 |
| Meltblown basis weight (osy) | 0.5 | 0.5 |
| Hydrohead (cm) | 53 | 77 |
| RBP (grams at 1 psi) | 2.1 | 0.8 |
| Frazier Porosity | 40 | 41.3 |

*Evolutions ® 3 - This comparative material is commercially available from the Kimberly-Clark Corporation of Neenah, Wisconsin, as part of a surgical gown under the trade designation Evolutions ® 3. It is a three layer, SMS laminate with two polypropylene spunbond layers and a polypropylene meltblown layer.

The results show that a laminate having an absorbent layer surprisingly increases the hydrohead and resistance to blood penetration, i.e., the barrier, of a fabric while conventional wisdom would have held that such a layer would have the opposite effect. The laminate of this invention provides superior barrier to commercially available Evolution® 3 fabric while having a comparable meltblown layer basis weight. In conventional SMS fabrics the meltblown layer provides the barrier properties.

What is claimed is:

1. A protective laminate comprising a first outer repellent spunbond layer of from about 0.1 to about 1 osy (3.4 to 34 gsm) containing an alcohol repellent in an amount of from about 0.1 to about 2 weight percent, and;

an inner repellent meltblown layer of from about 0.1 to about 1 osy (3.4 to 34 gsm) containing an alcohol repellent in an amount of from about 0.1 to about 1 weight percent, adhesively bonded using from about 0.1 to about 0.5 osy (3.4 to 17 gsm) of a meltblown adhesive to an absorbent, polyethylene-polypropylene side-by-side conjugate fiber layer of from about 0.1 to about 3 osy (3.4 to 102 gsm) having a density of between about 0.026 and about 0.013 ounces/cubic inch (0.045 to 0.022 grams/cubic centimeter) and containing an internal wetting agent in an amount from about 0.1 to about 3 weight percent, and;

wherein said layers are thermally point bonded to form said laminate.

2. The laminate of claim 1 wherein said laminate comprises an item selected from the group consisting of infection control products and personal care products.

3. The laminate of claim 2 wherein said item is a personal care product and said personal care product is a diaper.

4. The laminate of claim 2 wherein said item is a personal care product and said personal care product is a feminine hygiene product.

5. The laminate of claim 2 wherein said item is an infection control product and said product is a surgical gown.

6. The laminate of claim 2 wherein said item is an infection control product and said product is a face mask.

7. A nonwoven laminate for infection control applications having barrier properties consisting essentially of:

a first layer of a spunbond nonwoven web having a basis weight between 0.2 and 0.7 osy (6.8 and 23.7 gsm) and an internal, alcohol repellency additive in an amount of about 0.1 to about 2 weight percent, and;

a second layer of a meltblown nonwoven web having a basis weight between 0.2 and 0.7 osy (6.8 and 23.7 gsm) and an internal, alcohol repellency additive in an amount of about 0.1 to about 3 weight percent, and;

a third layer of a meltblown hot melt adhesive which comprises a mixture of polybutylene and polypropylene in a ratio of from 30/70 to 70/30 by weight, and;

a fourth layer of a polyethylene-polypropylene side-by-side conjugate spunbond fiber web having a basis weight between 1.5 and 2.5 osy (51 and 85 gsm) and a density between about 0.019 and about 0.015 ounces/cubic inch (0.033 to 0.027 grams/cubic centimeter), and an internal wetting agent, and;

wherein said layers are thermally point bonded to form said laminate.

* * * * *